United States Patent [19]

Cason et al.

[11] 4,410,957

[45] Oct. 18, 1983

[54] KEYSTROKE QUEUEING SYSTEM

[75] Inventors: William C. Cason, Austin; Jan W. Snyder, Elgin; both of Tex.

[73] Assignee: International Business Machines Corporation, Armonk, N.Y.

[21] Appl. No.: 208,623

[22] Filed: Nov. 20, 1980

[51] Int. Cl.³ .................................................. G06F 3/02

[52] U.S. Cl. .................................................. 364/900

[58] Field of Search ... 364/200 MS File, 900 MS File

[56] References Cited

U.S. PATENT DOCUMENTS

| | | | |
|---|---|---|---|
| 4,040,024 | 8/1977 | Cowe et al. | 364/900 |
| 4,069,511 | 1/1978 | Lelke | 364/200 |
| 4,110,823 | 8/1978 | Cronshaw et al. | 364/200 |
| 4,115,846 | 9/1978 | Laine | 364/200 |
| 4,212,077 | 7/1980 | Vittorelli | 364/900 |
| 4,223,393 | 9/1980 | Abe et al. | 364/900 |
| 4,281,393 | 7/1981 | Gitelman et al. | 364/900 |
| 4,330,845 | 5/1982 | Damerau | 364/900 |

*Primary Examiner*—Mark E. Nusbaum
*Assistant Examiner*—Mark P. Watson
*Attorney, Agent, or Firm*—Harold E. Meier

[57] ABSTRACT

A keyboard access system is provided for interfacing a keyboard and the programs of a text processing machine. The keyboard has typamatic function keys, i.e., nontypamatic keystroke information is generated by the keyboard upon depression of a key and, after a short delay, additional typamatic keystroke information is generated as long as the key is held down at a constant rate. The keystroke information represents a key on the keyboard and may also represent the meaning of the key as determined by the state of one or more prefix keys. A keystroke queue is provided for storing keystroke information passing through the keyboard access system. If the keystroke information entered into the keyboard access system is not typamatic, the system will enqueue the information in the keystroke queue and generate an audio feedback signal when the keystroke queue is not full. If the keystroke information is typamatic, the keystroke information will be compared to a table of valid typamatic function keys. If a comparison does not exist, the keystroke information is discarded. If a comparison does exist and the meaning of the key is acceptable, the keystroke information is enqueued if the preceding keystroke enqueued is no longer stored in the keystroke queue and discarded if the preceding keystroke is enqueued and currently stored in the keystroke queue and also represents the key to prevent excess information from being stored in the keystroke queue. This prevents operator overrun while using keys such as the vertical and horizontal cursor. In addition, the provision of a slow typamatic function rate permits the operator to read the text on a display while using a vertical cursor key.

20 Claims, 3 Drawing Figures

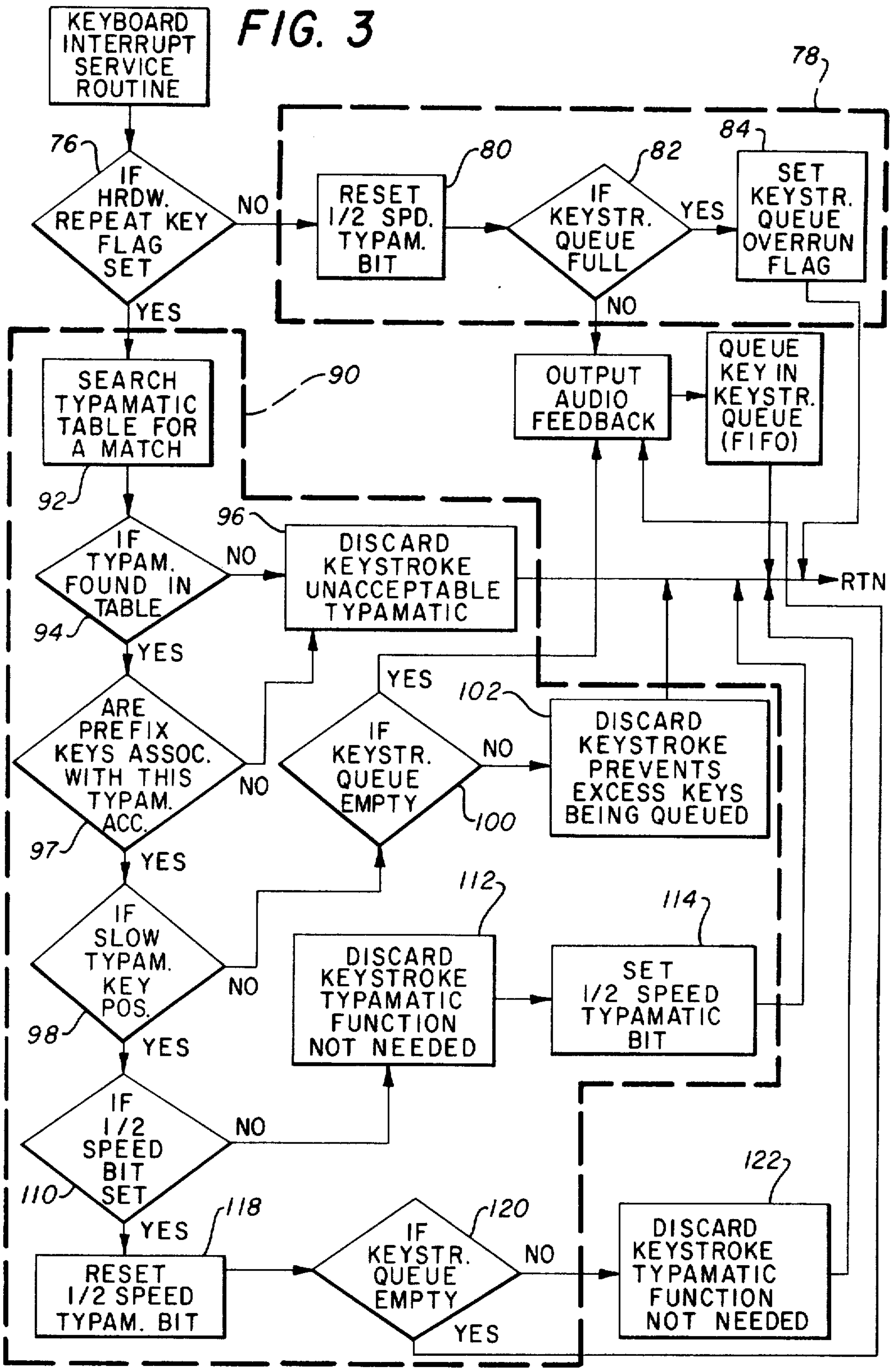
FIG. 3
KEYBOARD INTERRUPT SERVICE ROUTINE
76
IF HRDW. REPEAT KEY FLAG SET
NO
YES
78
80
RESET 1/2 SPD. TYPAM. BIT
82
IF KEYSTR. QUEUE FULL
YES
NO
84
SET KEYSTR. QUEUE OVERRUN FLAG
OUTPUT AUDIO FEEDBACK
QUEUE KEY IN KEYSTR. QUEUE (FIFO)
90
SEARCH TYPAMATIC TABLE FOR A MATCH
92
IF TYPAM. FOUND IN TABLE
94
96
DISCARD KEYSTROKE UNACCEPTABLE TYPAMATIC
RTN
ARE PREFIX KEYS ASSOC. WITH THIS TYPAM. ACC.
97
IF KEYSTR. QUEUE EMPTY
100
102
DISCARD KEYSTROKE PREVENTS EXCESS KEYS BEING QUEUED
IF SLOW TYPAM. KEY POS.
98
112
DISCARD KEYSTROKE TYPAMATIC FUNCTION NOT NEEDED
114
SET 1/2 SPEED TYPAMATIC BIT
IF 1/2 SPEED BIT SET
110
118
RESET 1/2 SPEED TYPAM. BIT
120
IF KEYSTR. QUEUE EMPTY
122
DISCARD KEYSTROKE TYPAMATIC FUNCTION NOT NEEDED

KEYSTROKE QUEUEING SYSTEM

BACKGROUND OF THE INVENTION

1. Field of the Invention

This invention relates to interfacing hardware and software components in a text information system and more particularly to interfacing a keyboard with software components.

2. Description of Prior Art

An electro-mechanical keyboard is a common means for operator interfacing with other components in an information system, such as a computer or text processing machine for inputting information and directing operation of the system. In some cases, the keystroke generation rate in the keyboard and the keystroke processing rate in the remainder of the system is asynchronous. If the keystroke generation rate is greater than the keystroke processing rate, keystroke information may be lost. This problem may be greatly alleviated or solved by providing a keystroke queue for storing generated keystroke information until processed.

However, many keys on a modern keyboard include a typamatic function. When the typamatic function is actuated, the keyboard hardware generates an initial nontypamatic keystroke and, after a short delay, repeated keystroke information as long as the key is held down by the operator. In a text processing machine, for example, vertical and horizontal cursor function keys are provided with a typamatic function to permit location of a cursor on a display of textual material. In a machine having a keystroke queue, the actuation of the typamatic function of a cursor key permits the entry of a number of cursor keystrokes into the keystroke queue in addition to the processed cursor keystrokes as represented by movement of the cursor on the display. This leads to an overshoot of the desired cursor position as the keystrokes processed and perceived by the operator on the display do not match the keystrokes generated.

SUMMARY OF THE INVENTION

In accordance with the present invention, a keyboard access system for processing keystroke information representing a key from a keyboard to a keystroke queue is provided. The keyboard includes typamatic function keys generating an initial nontypamatic keystroke prior to actuation of the typamatic function generating typamatic keystrokes. The keyboard access system includes a means for identifying the typamatic function keys and operates to enqueue the keystroke information in the keystroke queue. A typamatic control is provided for restricting the keystroke information from entering the keystroke queue if the sensor senses actuation of the typamatic function and the preceding keystroke enqueued in the keystroke queue and currently stored therein also represents the key. Therefore, sequential keystrokes representing the key cannot be concurrently stored in the keystroke queue when the later enqueued keystroke is typamatic.

In accordance with another aspect of the present invention, the keyboard access system further includes a table recording valid typamatic function keys. The typamatic control compares the keystroke information and the valid typamatic function keys in the table and enqueues the keystroke information only if a comparison is found.

In accordance with yet another aspect of the present invention, the keyboard access system further includes a prefix test for determining the actual meaning of a key having the typamatic function actuated when the meaning of the key may be varied by activating a prefix key, such a a key shift. The prefix test determines if the meaning of the key, in view of the state of the prefix keys, is acceptable as typamatic. If not, the keystroke information generated by the key when the typamatic function is actuated is discarded.

In accordance with yet another aspect of the present invention the keyboard access system further includes a half speed bit store having set and reset states for use with keys having a slow typamatic rate, such as the vertical cursor keys. The half speed bit store permits the system to discard alternate typamatic keystrokes of the vertical cursor keys to reduce the effective typamatic rate of the keys so that the operator may read the text on a display while using the keys. The typamatic control discards the typamatic keystroke information and sets the bit store if a comparison is found with a valid typamatic key in the table, the keystroke information represents a key having a slow typamatic rate and the bit store is not set. The typamatic control enqueues the keystroke information in the keystroke queue and resets the bit store if a comparison is found, the keystroke information reresents a key having a slow typamatic rate, the bit store is set and the preceding keystroke enqueued and currently stored in the keystroke queue does not represent the key or is no longer stored so that only every other keystroke generated when the typamatic function is actuated will be enqueued in the keystroke queue.

In accordance with another aspect of the present invention, feedback is provided to the operator for indicating the enqueueing of keystroke information in the keystroke queue. This feedback may be audio feedback.

In accordance with yet another aspect of the present invention, a method for processing keystroke information representing a key from a keyboard to a keystroke queue is provided. The keyboard includes typamatic function keys generating an initial nontypamatic keystroke prior to actuation of the typamatic function generating typamatic keystrokes. The method includes the steps of identifying a key having a nontypamatic function and enqueueing the keystroke information in the keystroke queue. The method also includes the steps of discarding the keystroke information if a key is identified with the typamatic function and the preceding keystroke enqueued and currently stored also represents the key.

BRIEF DESCRIPTION OF THE DRAWINGS

A more complete understanding of the invention may be had by reference to the following Detailed Description when taken in conjunction with the accompanying Drawings, wherein:

FIG. 3 is a logic flow chart of the keyboard interrupt service routine forming a portion of the present invention.

DETAILED DESCRIPTION

Figure 1:
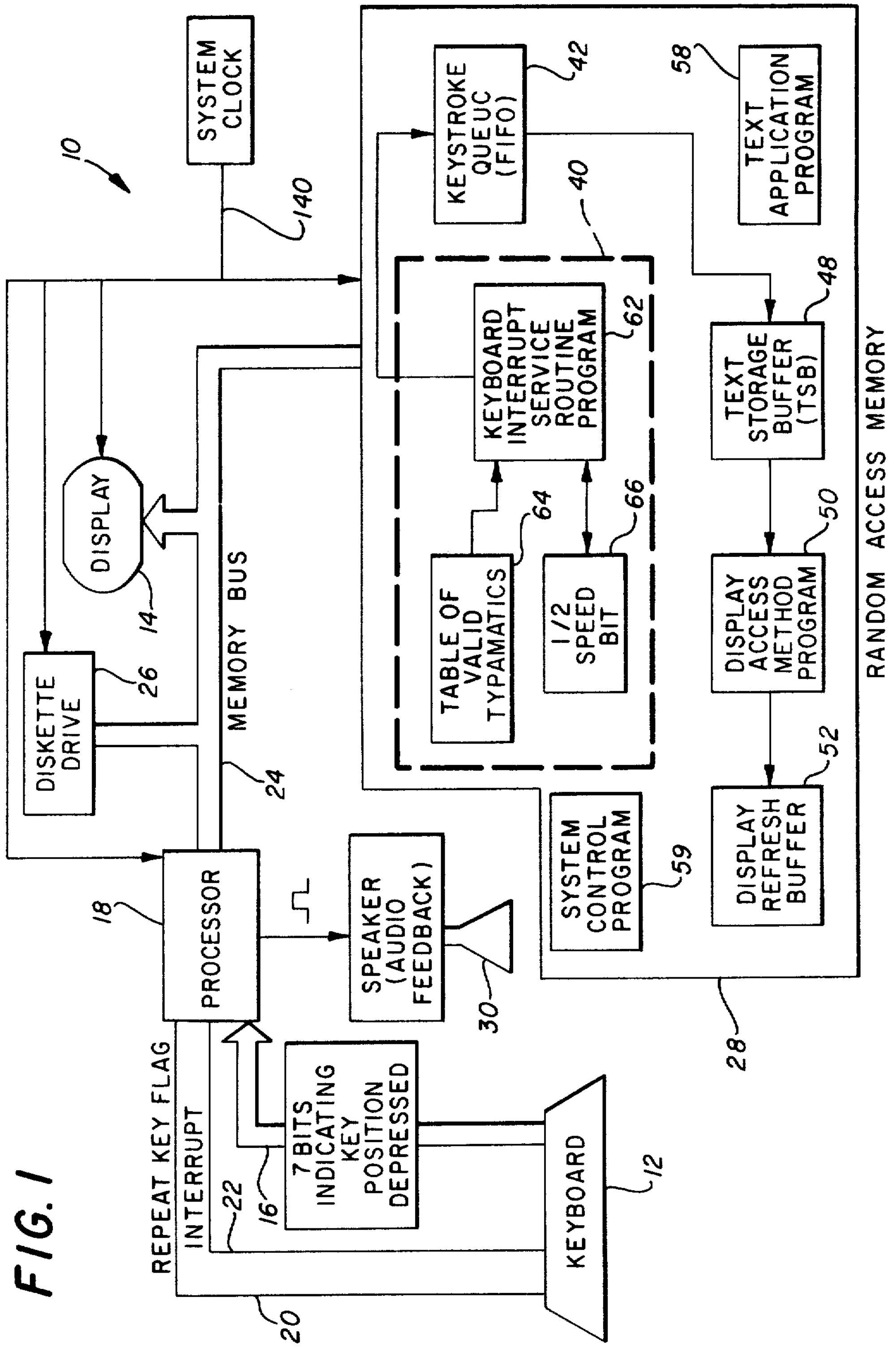
FIG. 1 is a block diagram of various components in a text processing machine in which the present invention is employed.

Referring now to the Drawings, wherein like reference characters designate like or corresponding parts throughout the several views, FIG. 1 illustrates a text processing machine 10 which includes a keyboard 12 interfaced with other components in the machine. Text processing machine 10 prepares hard or printed copies of text entered into the machine by operator controlled keys on the keyboard 12.

Typically, such a text processing machine incorporates a conventional electro-mechanical typewriter keyboard having additional control keys. The operator keystrokes are displayed on a display 14 quite similar in nature to a conventional television receiver screen. This screen either displays a full page of text, a partial page or, in some machines, only a single line of text. The display not only provides a visual presentation to the operator of the text being prepared but also provides prompting instructions for the operator on how to interface with the machine.

Between the keyboard 12 and display 14, the text processing machine includes computer electronics for evaluating the operator keystrokes to control the display, and in addition load the keystroke and instruction data into memory for future use in preparing hard copy. The ease of operation of the text processing machine for the operator is in great part determined by the electronics and associated computers and programs thereof. One area of importance in determining the ease with which an operator interfaces with a machine includes the response of display 14 to operator keystrokes on keyboard 12.

Each of the keys on keyboard 12 is capable of being actuated in a typamatic function. That is, after initial depression of the key and generation of an initial non-typamatic keystroke, additional typamatic keystroke information is electronically generated after an initial delay as long as the key is held down. There are, however, only certain keys out of the total keyboard arrangement which are allowed to be typamatic in the operation of the machine. Typical typamatic keys are the space bar, backspace, carrier return and cursor motion keys. The alphanumeric keys are typically non-typamatic, except for the letter x, which may or may not be typamatic. In addition, some keys may be typamatic or not depending on the state of one or more prefix keys such as the shift key. For example, the capital letter X may be typamatic and the lower case x not. Therefore, the key representing the letter x will be typamatic only when the shift key is activated to type capital letters.

Data is moved, copied or deleted from a display in the text processing machines by setting a cursor at the first character to be deleted or the last charcter to be deleted and then moving the cursor through a textual display in either a vertical or horizontal direction or a combination thereof. Cursor motion is controlled in the horizontal and vertical directions on the display 14 by four keys, one for left motion of the cursor, one for right motion, one for up motion and one for down motion. For text wider than the actual line width of the display 14, the non-displayed text will be moved into the display area as the cursor moves beyond either the left or right margin. When the cursor moves in the vertical direction beyond the upper or lower margins of display 14, a new line of text is brought up or down to the screen. For the full screen of text on display 14, this means one line will be deleted each time a new text line is brought into the display area.

The typical rate of typamatic keystroke generation with the typamatic function of a key actuated is approximately fourteen keystrokes per second. In operating the horizontal cursor motion functions, this typamatic keystroke generation rate permits the text entering display 14 from either the left or right side of the display to be read by the operator. However, a similar rate of typamatic keystroke generation by the vertical cursor functions causes visual distortion of the text. It has been found that a typamatic keystroke generation rate of 7 keystrokes per second for the vertical cursor functions will permit the operator to read the text.

Each keystroke of a key selected by the operator on keyboard 12 is transformed by the hardware within keyboard 12 into a seven bit byte of keystroke information and is transmitted along character bus 16 to processor 18. If a typamatic key is depressed a sufficient length of time to actuate the typamatic function of the key, a repeat key flag signal is transmitted over repeat key flag conductor 20 to processor 18. As noted above, when the typamatic function of a key is actuated, bytes of typamatic keystroke information are generated and transmitted over character bus 16 in a continuous manner. A keyboard interrupt conductor 22 is routed between keyboard 12 and processor 18 to interrupt the processing of keystroke information in the machine if so desired. The processor 18 is connected by a memory bus 24 to a disc drive 26, the display 14 and a random access memory 28. An audio loudspeaker 30 is operably connected with processor 18.

The random access memory 28 includes a keyboard access system 40 including a stored keyboard interrupt service routine program 62 which transmits keystroke information to a keystroke queue 42 for storage therein. The keystroke queue 42 is a first in, first out (FIFO) device. That is, the information first entered into the keystroke queue for storage from the keyboard access system 40 is the first information to exit the keystroke queue 42 for further processing in the machine. In the preferred embodiment, the keystroke queue 42 may store 16 individual keystrokes or 32 bytes of keystroke information, representing the key and the state of activation of the shift key prefix key. Keystroke information exiting keystroke queue 42 enters a text storage buffer (TSB) 48 and is subsequently used by a display access method program 50 and input to a display refresh buffer 52 for generating a display on display 14.

As noted hereinabove, the keystroke generation rate and the keystroke processing rate are asynchronous. The machine typically will be capable of executing only a single process, such as processing keystroke information, at any point in time. Which process is in execution is determined by the relative priority assigned to the process by a text application program 58. This creates a multilevel interrupt system with prioritized interrupt levels controlled by the system control program 59. Thus, it may be necessary to halt processing of keystroke information in order to complete a separate higher level priority process. To prevent loss of the keystroke information generated after processing of the keystroke information has been halted, the keystroke queue 42 stores the keystroke information. If the keystroke queue 42 becomes full, containing the maximum of 32 bytes of information, a keystroke queue overrun flag is generated which signals the text application program 58 to prioritize the processing of the keystroke information to reduce the quantity of information stored in the keystroke queue 42.

Another manner in which the keystroke generation rate may exceed the keystroke processing rate occurs when the information entered in the TSB exceeds its storage capacity. At that point, the text application program 58 requires keystroke processing to halt while portions of the material stored in the TSB are transferred to storage on magnetic discs in disc drive 26. Again, keystroke information generated will be entered into keystroke queue 42 until further processing of the keystroke information is permitted.

The keyboard access system 40 prevents the entry of more than one typamatic keystroke into keystroke queue 42 when the preceding keystroke enqueued and currently stored in the keystroke queue 42 represents the same key. This permits the typamatic function rate perceived by the operator visually through display 14 and aurally through audio loudspeaker 30 to be processed at a rate to match that of the machine keystroke information processing rate. The keyboard access system 40 also permits the majority of keys to have a relatively fast typamatic function rate while the vertical cursor keys have a relatively slow typamatic function rate. In addition, the keyboard access system 40 will consider the actual meaning of the key represented by the keystroke information by considering the activation of prefix keys, e.g., shift key, control, code or shift lock.

The keyboard access system 40 comprises a number of stored instructions and data within the random access memory 28 which define the keyboard interrupt service routine program 62, a table of valid typamatic keys 64 and a half speed bit store 66. The table of valid typamatic keys 64 includes a listing of each key for which a typamatic function is desired within the machine itself. Information denoting whether the typamatic function rate of each key is to be fast or slow is also recorded therewith. The information in this table is meant to be stored in a relatively permanent manner. The half speed bit store 66 has only two states, set or not set.

Figure 2:
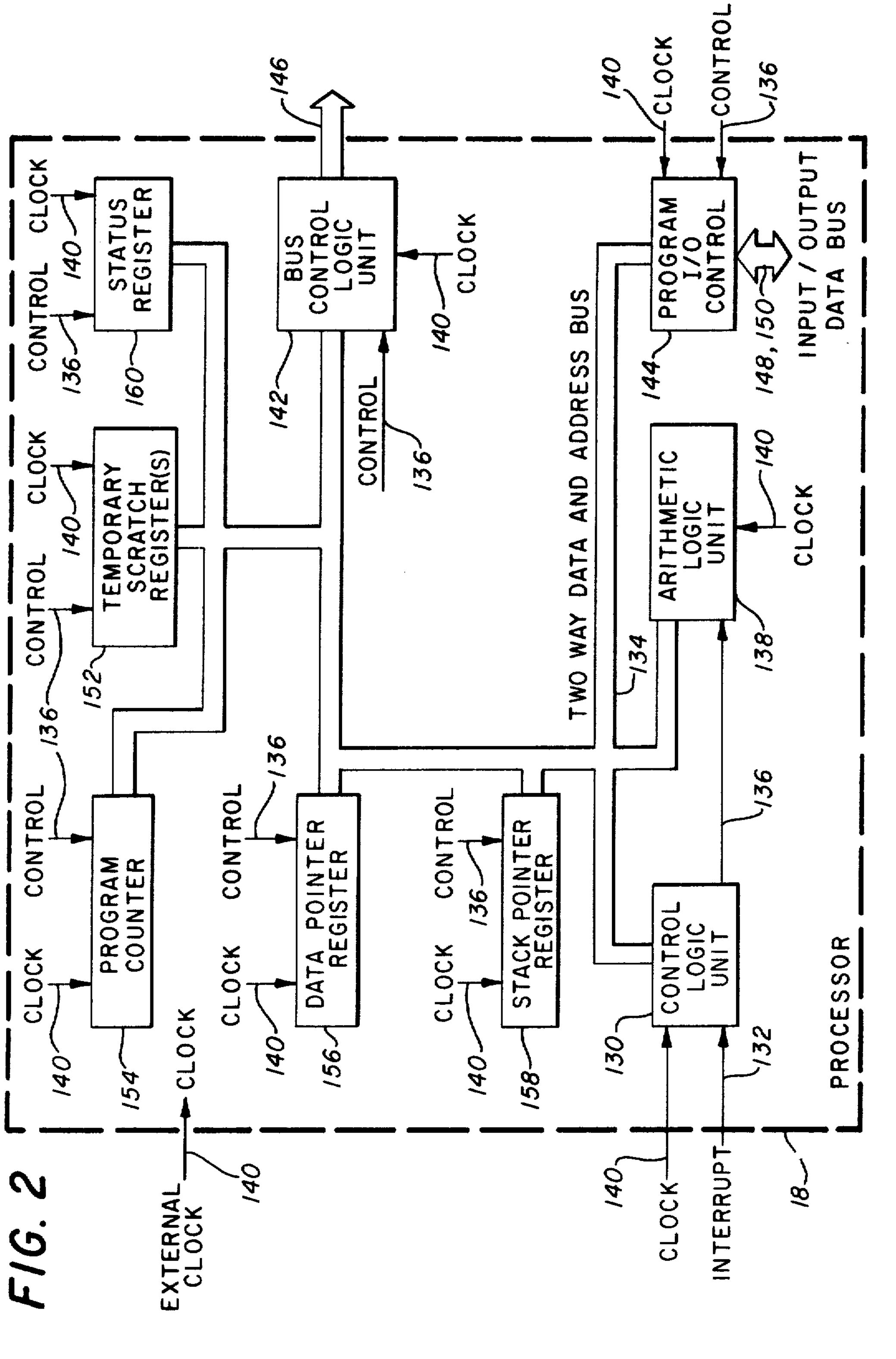
FIG. 2 is a block diagram of logic element components in the processor illustrated in FIG. 1.

Referring to FIG. 2, the processor 18 is further detailed to show typical logic hardware elements as found in such processors. The processor may be a commercially available unit, such as from Intel Corporation and identified by the Number 8086. Typically the processor includes a control logic unit 130 which responds to interrupts on a device bus 132 from the keyboard 12. The control logic unit 130 is also connected to the data and address bus 134 interconnected to various other logic units of the processor 18.

In response to a fetch instruction from the random access memory 28, the control logic unit 130 generates control signals to other logic elements of the processor. These control signals are interconnected to the various elements by means of a control line 136 which is illustrated directly connected to an arithmetic logic unit 138 and identified as a "control" line 136 to other elements of the processor. Synchronous operation of the control unit 130 with other logic elements of the processor 18 is achieved by means of clock pulses input to the processor from an external clock source 140. This instruction bus is also shown interconnected to other logic elements of the processor detailed in FIG. 2.

Data and instructions to be processed in the processor 18 are input through a bus control logic unit 142. Data to be processed may also come from program input/output control logic 144. The bus control logic 142 connects to storage elements of the random access memory 28 and receives instructions for processing data received from the input/output control 144 or received from the random access memory 28. Thus, the input/output control 144 receives data from the keyboard 12 or the random access memory 28 while the bus control logic 142 receives instructions and/or data from the same memory. Note that different storage sections of the random access memory are identifiable for instruction storage and data storage.

Device control information from the processor 18 is output through the program input/output controller 144 over a data bus (148,150). Input data on the data bus (148,150) from keyboard 12 is processed internally through the processor by instructions on the bus 134 to the status register 160. The arithmetic logic unit, in response to a control signal on line 136 and in accordance with instructions received on the memory bus 146, performs arithmetic computations which may be stored in temporary scratch registers 152. Various other transfers of data between the arithmetic logic unit 138 and other logic elements of the processor are of course possible. Such additional transfers may be to a status register 160, data pointer register 156 or a stack pointer register 158. Also in the data stream for these various logic elements by means of the bus 134 is a program counter 154.

A particular operating sequence for the processor 18 is determined by instructions and data on the memory bus 146 and input data on the bi-directional bus (148,150). As an example, in response to received instructions, the processor transfers data stored in the scratch registers 152 to one of the registers 156, 158 or 160. Such operations of processors as detailed in FIG. 2 are considered to be well known and understood by one of ordinary skill in the data processing field. A detailed description of each operation of the processor of FIG. 2 for the described invention would be counterproductive to an understanding of the invention as claimed.

FIG. 3 illustrates the logic operation of the keyboard interrupt service routine program 62. When keystroke information enters the keyboard access system 40, a test, represented by the logic sequence 76 identifies whether the repeat key flag conductor 20 has been energized. Energization of conductor 20 represents the actuation of the typamatic function of the key represented by the keystroke information.

If no signal is generated over the repeat key flag conductor 20, as will be the case with the keystroke information generated by the initial depression of any key on keyboard 12, the test of logic sequence 76 will be answered no. A nontypamatic control, represented by the logic sequence boxes within the dotted boundary 78 in FIG. 3, will then control the further processing of the nontypamatic keystroke information within the keyboard access system 40. The nontypamatic control will reset the half speed bit store 66 to the non-set state as noted by logic sequence 80. The nontypamatic control will then determine if the keystroke queue 42 is full, as represented by logic sequence 82. If the keystroke queue 42 is full, the nontypamatic control will set a keystroke queue overrun flag as a signal to text application program 58 to prioritize the processing of the keystroke information. This function is represented by logic sequence 84.

As noted hereinabove, the information stored within the keystroke queue 42 will be further processed to permit entry of new information for storage therein. If the keystroke queue 42 is not full, the nontypamatic control instructs the mechanism to generate an audio signal through the loudspeaker 30 to provide aural feedback to the operator to the effect that the key represented by the nontypamatic keystroke information has been entered into the keystroke queue 42 for further processing. This function is represented by the instruction 84. The nontypamatic keystroke information is subsequently entered into the keystroke queue 42 as represented by the instruction 86. The keyboard interrupt service routine program 62 is then returned to its initial position for entry of subsequent keystroke information.

If the repeat key flag conductor 20 is activated, logic function test 76 will provide a yes answer for the next entry of keystroke information, indicating that the typamatic function of the key is actuated. This will cause the typamatic keystroke information to be processed by a typamatic control represented by the logic sequences within the boundary 90 in FIG. 3. The first sequence of the typamatic control, represented by the logic sequences 92 and 94, is the comparison of the typamatic keystroke information with valid typamatic keys stored in table 64. As noted hereinabove, while every key on keyboard 12 may be actuated into a typamatic function, only selected keys are permitted to have a typamatic function in the machine. These selected keys form the valid typamatic keys in table 64. If the typamatic keystroke information does not correspond to a valid typamatic key, which information is the second and subsequent bytes from a keystroke, the keystroke information is discarded, as represented by logic sequence 96. The keyboard interrupt service routine program 62 then returns to its initial state for receipt of further keystroke information.

If the key represented by the keystroke information is a valid typamatic key, a test 97 is made to see if the actual meaning of the key is acceptable as typamatic, in view of the state of any prefix keys associated with the typamatic key. If not, the keystroke information is discarded as unacceptable. If so, a yes answer is provided and the typamatic control moves to sequence 98.

The typamatic control determines from table 64 whether that key is to have a slow or fast typamatic function rate as represented by logic sequence 98. In the preferred embodiment, the fast typamatic function rate is 14 keystrokes per second and this rate is used for the majority of keys. The slow typamatic function rate is 7 keystrokes per second and is used for the vertical cursor keys. If the key is to have a fast typamatic function rate, the typamatic control then determines if the keystroke queue 42 is empty, as represented by logic sequence 100. If the keystroke queue is not empty, the preceding keystroke enqueued and currently stored in the keystroke queue 42 must represent the same key as the key represented by the keystroke information being processed in the keyboard access system 40. Therefore, the typamatic keystroke information is discarded, as represented by logic sequence 102, to prevent excess storage of identical keystrokes which will lead to operator overshoot in operating the cursor functions as noted above. If the keystroke queue is empty, i.e., if the preceding keystroke enqueued is no longer stored in the keystroke queue, an audio output feedback is generated and the typamatic keystroke information representing the key is enqueued into the keystroke queue 42.

If the keystroke information represents a vertical cursor key having a slow typamatic function rate, the typamatic control then determines whether the half speed bit store 66 is set, as represented by logic sequence 110. If the half speed bit store is not set, the typamatic keystroke information will be discarded by the typamatic control, as represented by logic sequence 112 and the half speed bit store 66 will be set, as represented by logic sequence 114. The keyboard interrupt service routine program 62 is then returned to initial state for receipt of further keystroke information.

If the same key is maintained in the depressed state, the subsequent typamatic keystroke information will represent the same key previously discarded. However, the half speed bit store 66 will now be set and the typamatic control will process this keystroke information along the logic path determined by a yes answer to logic sequence 110. The typamatic control will first reset the half speed bit store 66 to the non-set state, as represented by logic sequence 118. The typamatic control will then determine if the preceding keystroke enqueued and currently stored in the keystroke queue 42 also represents the same vertical cursor key, as represented by logic sequence 120. The keystroke information must be discarded and the keyboard interrupt service routine program 62 returned to its initial state if logic sequence 120 is answered yes.

However, if the keystroke queue 42 is empty, so that the preceding keystroke enqueued is no longer stored in the keystroke queue, the keystroke information will be entered into the keystroke queue 42 and an audio output will be generated by the speaker 30. It can be readily seen that alternate bytes of typamatic keystroke information representing a key generated by a key having a slow typamatic function rate will be discarded so that the effective generation rate of this key is half that of the generation rate of the fast typamatic function rate key. Clearly, the typamatic function rate of the slow typamatic key may be slowed even further by discarding additional bytes of keystroke information.

In summary, the provision of keyboard access system 40 prevents sequential keystrokes representing the same key or having the same meaning from being concurrently stored in the keystroke queue when the later enqueued key is typamatic. This permits the control of the typamatic function rate generated by the operator to match that of the machine keystroke information usage rate to avoid operator overshoot. In addition, the provision of the half speed bit store 66 within the keyboard access system 40 permits a slow typamatic function rate of 7 keystrokes per second, which permits the text on the display 14 to be read by the operator while using the vertical cursor functions.

Although a single embodiment of the invention has been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

What is claimed is:

1. A keyboard access system for processing keystroke information from a keyboard to a keystroke queue, said keyboard including typamatic function keys which generate an initial nontypamatic keystroke prior to generating typamatic keystrokes, comprising:

test means for identifying the actuation of the typamatic function of a typamatic function key;

test means for identifying whether said keystroke queue is empty;

test means for identifying whether said keystroke queue is full;

a nontypamatic control means for enqueueing the keystroke information in the keystroke queue when said typamatic function has not been actuated and said keystroke queue is not full; and typamatic control means for enqueueing the keystroke information in the keystroke queue when said typamatic function has been actuated and said keystroke queue is empty, said typamatic control means discarding the keystroke information when said typamatic function has been actuated and said keystroke queue is not empty, whereby sequential keystrokes representing a key cannot be concurrently stored in said keystroke queue when the latter keystroke is typamatic.

2. The keyboard access system of claim 1 further comprising feedback means for indicating the enqueueing of keystroke information in the keystroke queue.

3. The keyboard access system of claim 1 further comprising table means for recording valid typamatic function keys, said typamatic control means further comparing the keystroke information with the valid typamatic function keys recorded in said table means when said test means for sensing the actuation of said typamatic function senses actuation of the typamatic function, said typamatic control means discarding the keystroke information if no comparison is found.

4. The keyboard access system of claim 1 wherein said typamatic control means further discards selected keystroke information generated by the typamatic function of elected typamatic function keys to reduce the effective keystroke information generation rate of the elected keys.

5. The keyboard access system of claim 1 wherein the keyboard includes prefix keys activatable concurrently with a typamatic function key so that each typamatic function key may have multiple meanings, said keyboard access system further comprising prefix test means for determining whether the actual meaning of a typamatic function key having the typamatic function actuated is acceptable as typamatic, said prefix test means discarding the keystroke information if the meaning is not acceptable.

6. A keyboard access system for processing keystroke information from a keyboard to a keystroke queue, said keyboard including typamatic function keys which generate an initial nontypamatic keystroke prior to generating typamatic keystrokes, comprising:

test means for identifying actuation of the typamatic function of a typamatic function key;

test means for identifying whether said keystroke queue is empty;

test means for identifying whether said keystroke queue is full;

table means for recording valid typamatic function keys;

a nontypamatic control means for enqueueing the keystroke information in the keystroke queue when said typamatic function has not been actuated and the keystroke queue is not full; and typamatic control means for comparing the keystroke information and the valid typamatic function keys recorded in said table means when said typamatic function has been actuated, said typamatic control means discarding the keystroke information if no comparison is found, said typamatic control means enqueueing the keystroke information in the keystroke queue if a comparison is found and said keystroke queue is empty, said typamatic control means discarding the keystroke information if a comparison is found and said keystroke queue is not empty such that sequential keystrokes representing a key cannot be stored in said keystroke queue when the latter enqueued key is typamatic.

7. The keyboard access system of claim 6 further comprising audio feedback means for informing the operator of the enqueueing of keystroke information in the keystroke queue.

8. The keyboard access system of claim 6 wherein said typamatic control means discards alternate entries of keystroke information generated by the typamatic function of an elected typamatic function key when a comparison is found to half the effective typamatic rate of the elected key.

9. The keyboard access system of claim 6 wherein the keyboard further includes prefix keys to define the meaning of the typamatic function keys, said keyboard access system further comprising prefix test means for determining if the actual means of a typamatic function key having the typamatic function actuated is acceptable as typamatic, said prefix test means discarding the keystroke information if the meaning is not acceptable.

10. A keyboard access system for processing keystroke information from a keyboard information from a keyboard to a keystroke queue, said keyboard including prefix keys and fast and slow typamatic function keys which generate an initial nontypamatic keystroke prior to generating typamatic keystrokes, comprising:

test means for identifying actuation of the typamatic function of a typamatic function key;

test means for identifying whether said keystroke queue is empty;

test means for identifying whether said keystroke queue is full;

a half speed bit store means having a set and not set state;

table means recording valid typamatic function keys and instructions characterizing the typamatic rate of each valid key either fast or slow;

audio feedback means for informing the operator of the enqueueing of keystroke information in the keystroke queue;

prefix test means for determining the meaning of a typamatic function key and discarding keystroke information if the meaning is unacceptable as typamatic;

a nontypamatic control means operable to reset said bit store means to the not set state when said test means fails to sense actuation of the typamatic function, said nontypamatic control means generating a keystroke queue overrun signal to reduce the keystroke information stored in the keystroke queue if the keystroke queue is full, said nontypamatic control means activating said audio feedback means and enqueueing the keystroke information when the keystroke queue is not full;

typamatic control means for comparing the keystroke information with the valid typamatic function keys recorded in said table means when said test means identifies actuation of the typamatic function, said typamatic control means discarding the keystroke information if no comparison is found, said typamatic control means discarding the keystroke information if a comparison is found and the meaning of the key represented by the keystroke information is unacceptable as typamatic, said typamatic control means enqueueing the keystroke information in the keystroke queue and activating said audio feedback means if a comparison is found, the meaning of the key represented by the keystroke information is acceptable as typamatic, the keystroke information represents a fast key and said keystroke queue is empty, said typamatic control means discarding the keystroke information if a comparison is found, the meaning of the key represented by the keystroke information is acceptable as typamatic, the keystroke information represents a fast key and said keystroke queue is not empty such that sequential keystrokes representing a fast key cannot be stored concurrently in said keystroke queue when the latter keystroke enqueued is typamatic; and said typamatic control means discarding the keystroke information and setting said half speed bit store means if a comparison is found, the meaning of the key represented by the keystroke information is acceptable as typamatic, the keystroke information represents a slow key and said half speed bit store means is not set, said typamatic control means discarding the keystroke information and resetting said bit store means if a comparison is found, the meaning of the key represented by the keystroke information is acceptable as typamatic, the keystroke information represents a slow key, said half speed bit store means is set and said keystroke queue is not empty such that sequential keystrokes representing a slow key cannot be stored concurrently in said keystroke queue when the latter is a typamatic keystroke, said typamatic control means enqueueing the keystroke information in the keystroke queue, activating said audio feedback means and resetting said half speed bit store means to the not set state if a comparison is found, the meaning of the key represented by the keystroke information is acceptable as typamatic, the keystroke information represents a slow key, said half speed bit store means is set and said keystroke queue is empty and the effective typamatic rate of a slow key is half that of a fast key.

11. A method for processing keystroke information from a keyboard to a keystroke queue, said keyboard including keys having a typamatic function which generate an initial nontypamatic keystroke prior to generating typamatic keystrokes, comprising the steps of:

identifying actuation of the typamatic function of a key;

identifying whether said keystroke queue is empty;

identifying whether said keystroke queue is full;

enqueueing the keystroke information in the keystroke queue if the typamatic function is not actuated and the keystroke queue is not full;

discarding the keystroke information if the typamatic function is actuated and said keystroke queue is not empty;

enqueueing the keystroke information in the keystroke queue if the typamatic function is actuated and said keystroke queue is empty.

12. The method of claim 11 further comprising the step of generating feedback to inform the operator that the keystroke information has been enqueued in the keystroke queue.

13. The method of claim 11 further comprising the step of comparing the keystroke information and a table of valid typamatic function keys if the typamatic function is actuated and discarding the keystroke information if no comparison is found.

14. The method of claim 11 further comprising the step of discarding the keystroke information if the typamatic function is actuated and the meaning of the key represented by the keystroke information is not an acceptable typamatic.

15. The method of claim 11 further comprising the step of discarding selected entries of keystroke information generated by the typamatic function of elected typamatic function keys to reduce the effective typamatic function rate of the elected keys.

16. A method for processing keystroke information from a keyboard to a keystroke queue, said keyboard including keys having a typamatic function which generate an initial nontypamatic keystroke prior to generating typamatic keystrokes, comprising the steps of:

identifying actuation of the typamatic function of a key;

identifying whether said keyboard queue is empty;

identifying whether said keyboard queue is full;

enqueueing the keystroke information in the keystroke queue if the typamatic function is not actuated and the keystroke queue is not full;

comparing the keystroke information and a table of valid typamatic function keys if the typamatic function is actuated;

discarding the keystroke information if no comparison is found between the keystroke information and a valid typamatic function key;

discarding the keystroke information if a comparison is found between the keystroke information and a valid typamatic function key and said keystroke queue is not empty; and enqueueing the keystroke information if a comparison is found between the keystroke information and a valid typamatic function key and said keystroke queue is empty such that sequential keystrokes representing a key cannot be stored concurrently in said keystroke queue when the latter is a typamatic keystroke.

17. The method of claim 16 further including the step of generating an audio feedback to the operator when keystroke information is enqueued in the keystroke queue.

18. The method of claim 16 further comprising the step of discarding alternate entries of keystroke information generated by the typamatic function of an elected typamatic key if a comparison is found between the keystroke information and a valid typamatic function key to half the effective typamatic function rate of the elected key.

19. The method of claim 16 further comprising the step of discarding the keystroke information if a comparison is found between the keystroke information and a valid typamatic function key and the meaning of the key represented by the keystroke information as determined by the state of one or more prefix keys is an unacceptable typamatic.

20. A method for processing keystroke information from a keyboard to a keystroke queue, said keyboard including prefix keys and keys having a typamatic function which generate an initial nontypamatic keystroke prior to generating typamatic keystrokes at either a fast or slow rate, comprising the steps of:

identifying actuation of the typamatic function of a key;

identifying whether said keystroke queue is empty;

identifying whether said keystroke queue is full;

resetting a half speed bit store having a set or not set state to the not set state if the typamatic function is not actuated;

enqueueing the keystroke information in the keystroke queue if the typamatic function is not actuated and the keystroke queue is not full;

generating a keystroke queue overrun flag to reduce the keystroke information stored in the keystroke queue if the typamatic function is not actuated and the keystroke queue is full;

comparing the keystroke information and a table of valid typamatic function keys if the typamatic function is actuated;

discarding the keystroke information if no comparison is found between the keystroke information and a valid typamatic function key;

discarding the keystroke information if a comparison is found between the keystroke information and a valid typamatic function key and the meaning of the key represented by the keystroke information is an unacceptable typamatic;

discarding the keystroke information if a comparison is found between the keystroke information and a valid typamatic function key, the meaning of the key represented by the keystroke information is an acceptable typamatic, the typamatic function rate is fast and said keystroke queue is not empty;

enqueueing the keystroke information in the keystroke queue if a comparison is found between the keystroke information and a valid typamatic function key, the meaning of the key represented by the keystroke information is an acceptable typamatic, the typamatic function of the key is fast and said keystroke queue is empty such that sequential keystrokes representing a fast key cannot be stored concurrently in said keystroke queue when the latter is a typamatic keystroke;

discarding the keystroke information and setting the half speed bit store if a comparison is found between the keystroke information and a valid typamatic function key, the meaning of the key represented by the keystroke information is an acceptable typamatic, the typamatic function rate of the key is slow and the half speed bit store is not set;

enqueueing the keystroke information and resetting the half speed bit store to the not set state if the comparison is found between the keystroke information and a valid typamatic function key, the meaning of the key represented by the keystroke information is an acceptable typamatic, the typamatic function of the character is slow, the half speed bit store is set and said keystroke queue is empty; and discarding the keystroke information and resetting the half speed bit store to the not set state if a comparison is found between the keystroke information and a valid typamatic function key, the meaning of the key represented by the keystroke information is a acceptable typamatic, the typamatic function is slow, the half speed bit store is set and said keystroke queue is empty such that sequential keystrokes representing a slow key cannot be stored concurrently in said keystroke queue when the latter is a typamatic keystroke.

* * * * *

UNITED STATES PATENT AND TRADEMARK OFFICE

CERTIFICATE OF CORRECTION

PATENT NO. : 4,410,957

DATED : October 18, 1983

INVENTOR(S) : W.C. Cason and J.W. Snyder

It is certified that error appears in the above—identified patent and that said Letters Patent is hereby corrected as shown below:

Column 10, line 18 delete "means" and insert therefor --meaning--.

Column 10, line 23 delete "information from a keyboard", first occurrence.

Signed and Sealed this

*Eighth* Day of *May 1984*

[SEAL]

*Attest:*

GERALD J. MOSSINGHOFF

*Attesting Officer* *Commissioner of Patents and Trademarks*